United States Patent
Brahmbhatt et al.

(10) Patent No.: US 10,599,390 B1
(45) Date of Patent: Mar. 24, 2020

(54) METHODS AND SYSTEMS FOR PROVIDING MULTI-USER RECOMMENDATIONS

(71) Applicant: Amazon Technologies, Inc., Seattle, WA (US)

(72) Inventors: Kintan Dilipkumar Brahmbhatt, San Francisco, CA (US); Brandon Scott Durham, Seattle, WA (US); Kristine Anne Hanson, Palo Alto, CA (US); Rickesh Pal, San Francisco, CA (US); Ted William Thetford, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 327 days.

(21) Appl. No.: 14/981,612

(22) Filed: Dec. 28, 2015

(51) Int. Cl.
| | | |
|---|---|---|
| *G06F 3/048* | (2013.01) | |
| *G06F 3/16* | (2006.01) | |
| *G06F 3/0482* | (2013.01) | |
| *G06F 16/438* | (2019.01) | |

(52) U.S. Cl.
CPC ............ *G06F 3/167* (2013.01); *G06F 3/0482* (2013.01); *G06F 3/165* (2013.01); *G06F 16/4387* (2019.01)

(58) Field of Classification Search
CPC .............. G06F 17/30053; G06F 3/167; G06F 17/30828
USPC ........................................................ 715/728
See application file for complete search history.

(56) References Cited

U.S. PATENT DOCUMENTS

| | | | |
|---|---|---|---|
| 8,700,102 B2 | 4/2014 | Ferren et al. | |
| 9,363,155 B1* | 6/2016 | Gravino | G06Q 30/02 |
| 10,380,208 B1 | 8/2019 | Brahmbhatt et al. | |
| 2008/0154870 A1 | 6/2008 | Evermann et al. | |
| 2012/0034904 A1 | 2/2012 | Lebeau et al. | |
| 2012/0035924 A1 | 2/2012 | Jitkoff et al. | |
| 2012/0084277 A1 | 4/2012 | Barve et al. | |
| 2012/0124456 A1* | 5/2012 | Perez | G06Q 30/02 |
| | | | 715/200 |
| 2013/0326555 A1* | 12/2013 | McMahon | H04N 21/25891 |
| | | | 725/38 |
| 2014/0298364 A1* | 10/2014 | Stepanov | H04N 21/25 |
| | | | 725/10 |
| 2015/0052115 A1* | 2/2015 | Sharifi | G06F 16/685 |
| | | | 707/722 |
| 2015/0081663 A1 | 3/2015 | Raniere | |
| 2016/0234595 A1 | 8/2016 | Goran et al. | |

(Continued)

OTHER PUBLICATIONS

U.S. Appl. No. 14/981,273, filed Dec. 28, 2015, Titled: Methods and Systems for Providing Context-Based Recommendations.

*Primary Examiner* — Alex Olshannikov
(74) *Attorney, Agent, or Firm* — Kilpatrick Townsend & Stockton LLP

(57) ABSTRACT

Techniques described herein can be used to provide recommendations for multiple users. In particular, one or more users may interact with an interactive device to stream media content or utilize other services provided by a service provider. The users may provide commands to the interactive device to request content from a service provider. Contextual data associated with the request may be used to determine that an audience of the interactive device comprises more than one user. Based on this determination, content recommendations can be provided so that the recommendations are more likely to be suitable for the audience.

19 Claims, 8 Drawing Sheets

(56) References Cited

U.S. PATENT DOCUMENTS

2017/0006356 A1     1/2017   Krasadakis
2017/0358302 A1   12/2017   Orr et al.

* cited by examiner

METHODS AND SYSTEMS FOR PROVIDING MULTI-USER RECOMMENDATIONS

CROSS-REFERENCE TO RELATED APPLICATIONS

This application incorporates by reference for all purposes the full disclosure of U.S. patent application Ser. No. 14/981,273, filed Dec. 28, 2015, entitled "METHODS AND SYSTEMS FOR PROVIDING CONTEXT-BASED RECOMMENDATIONS".

BACKGROUND

Network-enabled devices allow people to utilize online services to shop, stream music, watch movies, etc., without leaving the comfort of their homes or wherever they are. However, such services are typically provided for use by a single user. As such, the services provided are typically customized based on the preferences of the single user, regardless of whether the audience comprises more than one user. Thus, such individual-based services may not be desirable in a group context where multiple individuals are present. For instance, the content provided by the individual-based services may not accommodate the preferences of the whole group. A user may explicitly poll the group to determine what content/service to request, but such manual polling by the user can be time consuming and inaccurate.

BRIEF DESCRIPTION OF THE DRAWINGS

Various embodiments in accordance with the present disclosure will be described with reference to the drawings, in which.

DETAILED DESCRIPTION

Figure 1:
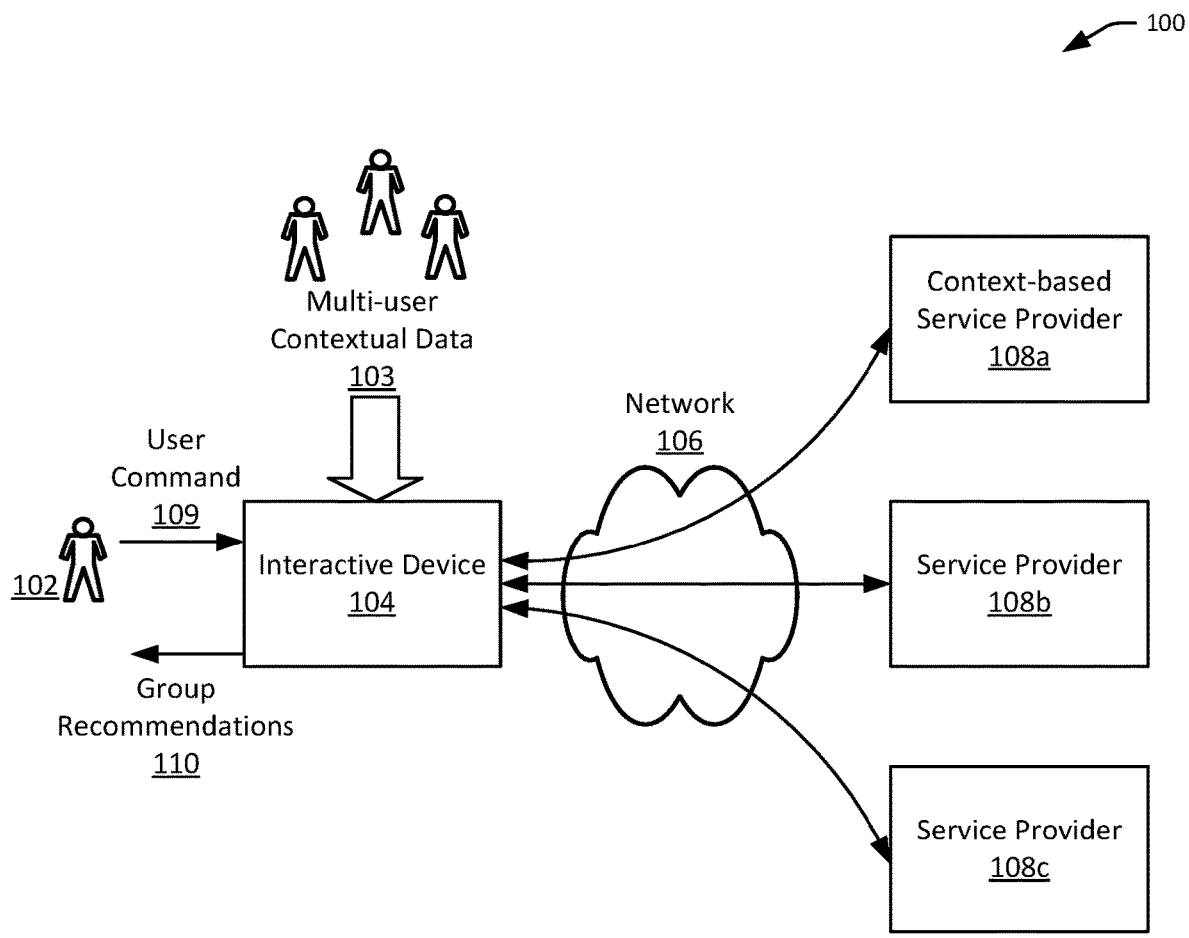
FIG. 1 illustrates an example environment for providing context-based multi-user recommendations, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein can be used to provide recommendations for multiple users. In particular, one or more users may interact with an interactive device to stream media content or utilize other services provided by a remote (e.g., cloud-based) service provider. The users may provide commands to the interactive device using voice command, gestures, touch screens, or any other suitable input method. The interactive device may transmit requests based on such user commands to the service provider, receive corresponding responses (e.g., recommended media content) from the service provider, and present the responses to the user(s). Before the response is provided, the interactive device or the service provider may determine that an audience of the interactive device comprises more than one user and use such information to customize the response for such an audience.

In some embodiments, a presence of more than one user may be detected near the interactive device based on data from various sensors. The data can indicate an environment surrounding the interactive device. For instance, microphones attached to or operably connected to the interactive device may capture ambient sound in an environment surrounding the interactive device. The ambient sound may include more than one distinct human voice. Voice recognition techniques may be used to determine the identities of the users associated with distinct voices. Image sensors (e.g., cameras) may capture images of the surrounding environment. Such images can be processed using facial recognition techniques to identify the users. Proximity sensors (e.g., infrared sensors or lidar sensors) may be used to determine people near the interactive device or people within a predetermined distance from the device. Location sensors (e.g., GPS sensors) may be used to determine people within a certain distance from a given location. Wireless signals (e.g., Bluetooth® or Wi-Fi) from portable devices (e.g., mobile phones) near the interactive device may also indicate the presence of a group of people.

An environment includes surroundings or conditions in which one or more people, animals, plants, or other objects are located. The environment can include naturally occurring elements (e.g., weather, climate, natural resources, animals, plants, natural landscape, etc.) and/or man-made elements (e.g., noise, pollution, people, buildings, vehicles, machineries, consumer products, appliances, etc.). At any given time, an object can be surrounded by more than one environment with different scopes defined by the distance from the object. For example, a person can be inside a room environment within a few feet of the user, which is inside a building environment within a few hundred feet, which is within a city environment defined by the city limit, which is inside a state environment defined by the state boundary, and so on. An environment of an interactive device, as discussed herein, typically includes those surroundings (e.g., people, objects) and conditions that are within a detectable distance from the interactive device. At any given time, the detectable distance may be determined by the limits and configurations of environment sensors that are active at the given time. For example, a microphone array of the interactive device is capable of detecting audible sound from as far as 15 feet away. A proximity sensor of the interactive device is capable of detecting objects from as far as 20 feet. And interactive device is capable of detecting Bluetooth signals from as far as 30 feet. Then, the detectable distance may be 15 feet when only the microphone array is active, 20 feet when both the microphone array and the proximity sensor are active, and 30 feet when Bluetooth is also enabled.

In some embodiments, a group setting may be determined based on characteristics of the interactive device, such as software and/or hardware configurations (e.g., device type, device mode, operating system). For instance, a type of the interactive device (e.g., smart TV) may indicate that the device is meant for communal consumption as opposed to individual consumption (e.g., mobile phone). In some embodiments, a device may be associated with multiple consumption modes. Examples of such a device can include a game console, a smart TV, a media player, and other interactive devices. A group mode may indicate that the device (and the output thereof) is meant for group consumption. An individual mode may indicate that the device is meant for individual consumption. Additional modes (e.g., modes associated with groups of different sizes and/or composition) may also be available in some cases. The device may switch between these modes based on predetermined events such as related to time, user input (e.g., via voice command, gesture, remote controller, touchscreen, mouse, keyboard, etc.), and other events.

A response may be generated based on the determination of the audience. The response may include information related to recommendations for the audience. In some embodiments, multiple users can be identified in the audience. In such embodiments, user recommendations can be generated by user-level attributes or characteristics (e.g., user preferences, demographics, etc.) for the identifiable users and combined to form group recommendations for the audience. For instance, the group recommendations can be generated based on an intersection of the users' individual preferences. Alternatively, the group recommendations can include a union of the users' individual preferences. In some other embodiments, a general group setting (e.g., party, classroom) may be determined, but the users in the group setting may not be individually identified. In such embodiments, group recommendations may be determined based on the particular group setting or context. For example, if the context is a party, then loud and lively music may be recommended in the group recommendations. The group recommendations may also be determined based on group-level attributes or characteristics (e.g., group preferences, demographics, etc.). For instance, a different type of music may be provided to a group of students with an average age of 20 than for a group of working professionals with an average age of 35. The group preferences or demographics may be determined (e.g., estimated) based on explicit or implicit indications. For instance, a group of people may indicate their preferences to music or other information via surveys or feedbacks using websites, mobile applications, or any other suitable interface. As another example, group demographics may be determined implicitly based on a time, location, or other contextual data. For instance, if the location of a group is a dorm on a college campus, then the group is likely to comprise mostly college students. In some embodiments, a combination of user-level characteristics and group-level characteristics may be used to generate recommendations.

In some embodiments, the group recommendations may be dynamically adjusted to accommodate changing groups. For instance, when one or more users leave or join a group, such change in group composition may be detected and used to update the group recommendations so as to accommodate the new or updated audience. In some embodiments, the group recommendations may also be dynamically adjusted based on feedbacks from the group.

Consider the following example use case. Alice says "play music" to a voice-activated interactive device to stream from a cloud-based music streaming service. When the interactive device senses that Alice is by herself, the music that is streamed is mostly selected from her favorites. When the interactive device senses that Alice is with other people in a group setting, the music that is streamed may be selected to please not only Alice, but also other people in the group. For instance, Alice's husband, Brian is determined to be in the group, the streamed music may be selected so as to include music from both Alice's and Brian's favorites. Now suppose Carol, their 5-year-old daughter, enters the room. The music that is being streamed can be dynamically adjusted to be more suitable for the whole family to enjoy. For instance, songs with explicit lyrics not suitable for a 5-year-old may be removed.

The context-based multi-user recommendation service described herein provides an improved shared experience of content in a group setting. In particular, instead of one user monopolizing the content be streamed or played back, preferences of the group as a whole are taken into account in the selection of the content. Furthermore, the group recommendations are generated automatically based on the current contextual data with minimal user intervention, hence saving the users time and efforts for coming up with the right music (especially with a large group of people). Furthermore, in some instances, the generated recommendations may be better or more appropriate than what the user would have chosen, given the large amount of media content that the recommendation service can choose from.

Various embodiments will now be discussed in greater detail with reference to the accompanying figures, beginning with FIG. 1.

FIG. 1 illustrates an example environment 100 for providing context-based multi-user recommendations, in accordance with embodiments. As illustrated, a user 102 can interact with an interactive device 104 using user command 109 in order to utilize services provided by one or more service provider computers 108a-c over a network 106, including a content-based service provider 108a. The interactive device 104 can be configured to also capture contextual data 103 indicative of a multi-user context. The user command 109 and the multi-user contextual data 103 may be provided to the context-based service provider 108a, which may provide group recommendations 110 suitable for the group context.

While the following discussion uses streaming service for media content (e.g., audio or video content) as an example, it is understood that any suitable service may be provided using the techniques described herein. Examples of the services can include the retrieval or streaming of music, radio, video, weather forecast, traffic condition, or other content. Other services may also allow users to perform real-time or nearly real-time communication with other users over the network such as participating in audio or video calls. Additional examples of the services can include shopping, personal finance management (e.g., banking or investment), travel arrangement, gaming, and the like.

In various embodiments, the interactive device 104 can be configured to receive a user's voice command 109 or other user command provided via gestures, touch, remote controller, mobile device (smart phone), mouse, stylus, keyboard, keypad, touchscreen, or any other suitable means. In an embodiment, the user input may be processed by the interactive device 104 to generate one or more requests or messages to the suitable service providers. For instance, the interactive device may process a voice command from a user to determine what type of service is being requested and which service provider to contact. For instance, if the user command is a voice command, a voice-based service interface may be invoked. If the user command is a text-based command, a text-based service interface may be invoked. If the user command is "play music," a music streaming service may be invoked. If the user command is to obtain the current traffic update, a traffic service may be invoked. And so on. In another embodiment, the interactive device may provide the user input directly to a service provider which then processes the user input. For instance, a voice command may be provided to a service with a voice-based interface and voice recognition capabilities. An image of a gesture may be provided to a service with an image-based interface and image processing capabilities. And so on.

The interactive device may be also be configured to receive contextual data indicative of a multi-user group context. Generally, contextual data can indicate an environment in which the user and/or the interactive device are located. Examples of contextual data can include time or location of the user and/or interactive device, ambient sound, light, smell, movement, proximity to surrounding objects, and the like. For example, the ambient sound can include voices of people or pets, sound from electronics and appliances (e.g., phone rings, radio, TV, microwave, dishwasher, washer/dryer, air conditioning or heater), sound from vehicles (e.g., cars, planes, ships) or machineries, sound from nature (e.g., wind, rain, thunder, trees, animals), and the like. Contextual data indicating a group context may include data indicating the presence of more than one user (e.g., ambient sound with distinct voices, images with distinct faces).

In some cases, contextual data can also include information about the interactive device such as a device identifier, device type, a consumption mode, an operating state, a spatial disposition, a movement, and/or any other suitable aspects of the interactive device. In some other cases, contextual data can include information about other objects in the surrounding environment of the interactive device. In various embodiments, such contextual data can be captured by suitable sensors that may be part of or operably connected to the interactive device.

The interactive device can be configured to collect such contextual data in any suitable manner. In some cases, contextual data can be captured in the same environment in which the command occurred and/or around the same time when the command occurred. For example, the duration of the contextual data can span a period of time before and/or after the occurrence of the user command. The contextual data can be captured in response to certain triggering event such as when a certain time is reached, a change in an environmental factor, a predetermined user input (e.g., a phrase or gesture), and the like. The contextual data can also be captured on an ongoing or periodic basis (e.g., every two seconds). The types and/or the amount of contextual data collected may also vary depending on the state of the device, time of day or day of week, external events, user actions, and other factors.

Some or all of the contextual data collected by the interactive device and/or other devices may be provided to a context-based service provider 108a via a network 106. In some cases, the contextual data may be provided along with the user command (e.g., voice command). For instance, a voice command and its background ambient sound may be provided as a single audio recording to the service provider. In some other cases, the contextual data and the command data may be provide separately in separate parts of the same message or in separate messages. In some cases, the contextual data and/or the command data may be preliminarily processed by the interactive device to determine the suitable service provider and/or the suitable interface to be invoked.

The context-based service provider 108a may be configured to analyze of the contextual data provided by the interactive device to determine a group context which includes multiple people. For example, voice recognition techniques and facial recognition techniques may be used to identify users based respectively on audio and visual data. In some other embodiments, a context of a group setting may be determined without identifying individual users. The group context may be determined based on features extracted from the contextual data. For instance, noisy audio data or an image with multiple human features may indicate a group setting. In some cases, the context may be determined implicitly from time and/or location data (e.g., a Friday evening in a movie theatre).

Recommendations with respect to services to be provided to the user may then be generated based on the group context. For instance, user recommendations may be generated for each of the identifiable users based on user preferences and the user recommendations may be combined to form the group recommendations. As another example, group attributes such as demographics may be determined based on the group context and used to infer group preferences, which are in turn used to generate group recommendations.

In some embodiments, user or group attributes used to generate recommendations can include personal information (e.g., age, occupation, race, ethnicity, language), preferences (e.g., favorite types of music or artists, preference indicators such as "like" or "dislike" provided by the user), patterns of user or group behaviors (e.g., frequent streaming or playback of a particular song or songs by a particular artist), and the like.

In some embodiments, the recommendations can also be generated based on information about the device. Such information can include historical data associated with users of the device such as user interaction data (e.g., browsing history), requests/responses with service providers, playlists, libraries, behavioral data of users of the device (e.g., playback or streaming habits), and the like.

In some embodiments, the context-based service provider 108a may itself utilize services provided by the other service providers 108b, 108c in order to provide a service to the user. For example, a context-based music streaming service provider 108a may rely on a voice recognition service 108b to analyze audio data received from the user and may obtain music from another music service provider 108c.

In some embodiments, the context-based service provider 108a may provide requested data directly to the interactive device, For instance, a context-based music streaming service may stream music directly to the interactive device. In some other embodiments, the context-based service provider 108a may provide information about the requested data, such as instructions on how to obtain the requested data from other service providers 108b, 108c, to the interactive device. Such information may include a resource identifier (e.g., a Uniform Resource Identifier (URI)) of a web service and/or parameters thereof, connection information to a data store, credentials to access a resource, and the like. The interactive device may then obtain the requested data from such other service providers using such information. In either case, the interactive device 104 can be configured to output group recommendations 110 via a speaker, a display, a tactile device, or the like. The group recommendations 110 can include audio, video, or any other suitable type of media content recommended by a context-based service provider 108a.

Figure 2:
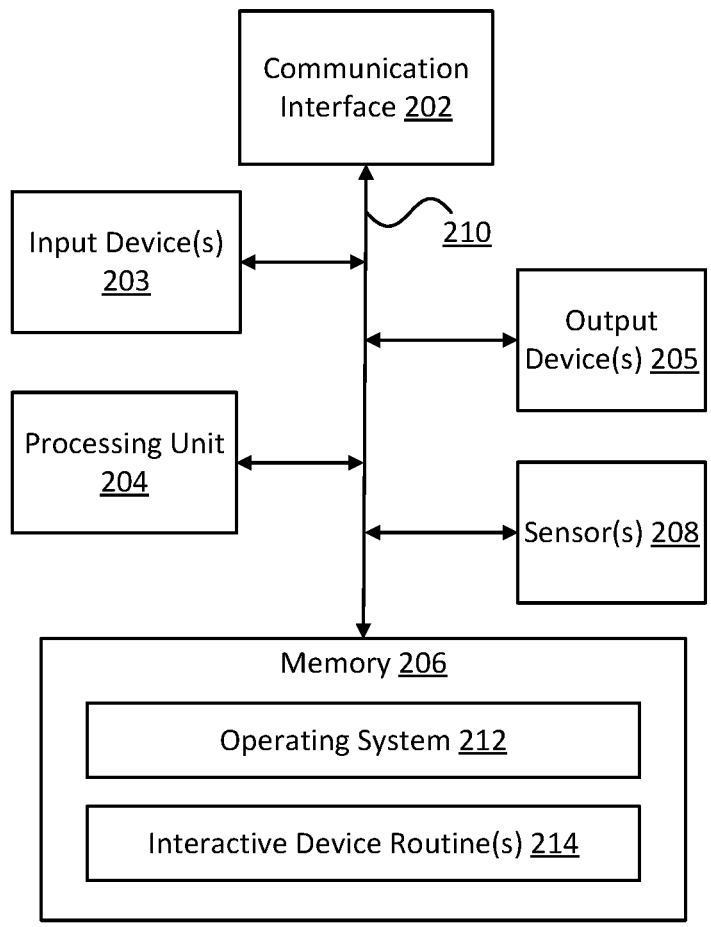
FIG. 2 illustrates example components of an interactive device for implementing aspects of the present invention, in accordance with embodiments.

FIG. 2 illustrates example components of an interactive device 200 for implementing aspects of the present invention, in accordance with embodiments. In an embodiment, the interactive device 200 may be configured to implement interactive device 104 of FIG. 1. In some embodiments, interactive device 200 may include many more components than those shown in FIG. 2. However, it is not necessary that all of these generally conventional components be shown in order to disclose an illustrative embodiment.

As shown in FIG. 2, the interactive device 200 may be any type of computing device such as, but not limited to, a voice-activated media player or smart TV, a game console, a set-top box, a mobile phone, a smart phone, a personal digital assistant (PDA), a laptop computer, a desktop computer, a server computer, a thin-client device, a tablet PC, etc. Additionally, interactive devices 200 may be any type of wearable technology device, such as a watch, earpiece, glasses, etc.

In an embodiment, interactive device 200 includes one or more input devices 203, one or more output devices 205, one or more optional sensors 208, one or more processing units 204, a memory 206, all interconnected along with the communication interface 202 via a bus 210.

The interactive device 200 can include a communication interface 202 configured to transmit and/or receive data from one or more external devices (e.g., a terminal, display device, or other remote controller). In particular, the communication interface 202 may be configured to communicate with a service provider computer such as discussed in FIG. 3, a user device operated by a user, another interactive device, or any other suitable objects. Any suitable means of communication can be used, such as wired communication or wireless communication. For example, the communication interface 202 can utilize one or more of local area networks (LAN), wide area networks (WAN), infrared, radio, WiFi, point-to-point (P2P) networks, telecommunication networks, cloud communication, short range communication network (e.g., Bluetooth or Near Field Communication (NFC)), and the like. Optionally, relay stations, such as towers, satellites, or mobile stations, can be used. Wireless communications can be proximity dependent or proximity independent.

The interactive device 200 can also include one or more input devices 203 for receiving user input. Examples of input devices can include microphones or microphone arrays, camera, remote controller, mouse, stylus, keyboard, keypad, touchscreen, biometric scanner, or any other suitable means. In some embodiments, the user input devices 203 can be used to collect a user's biometric information such as retina scan, fingerprint, facial recognition, blood pressure, heart rate, glucose level, and the like.

The interactive device 200 can optionally include one or more sensors 208 for sensing contextual data. Examples of such sensors 208 can include auditory sensors (e.g., microphone, noise filters, and other sensors for capturing sound), position sensors (e.g., GPS sensor and magnetometer), temperature sensors (e.g., mechanical or electrical temperature sensor), pressure sensors (e.g., barometer), chemical sensors (e.g., breathalyzers and carbon monoxide sensor), motion sensors (e.g., accelerometers), rotation sensors (e.g., gyroscope), proximity sensors (e.g., ultrasound sensors, Lidar sensors, or infrared sensors), light sensors (e.g., visible light camera, infrared camera, RGB camera, depth aware camera, infrared laser projector, ultraviolet sensitive cameras, scanning sensor, light filters and any combination of the foregoing), smell sensors, and the like. In some embodiments, some or all of the sensors may be an integral part of the interactive device 200. For instance, some of the sensors may be contained within or attached to a housing of the interactive device 200. Some or all of the sensors can be the input devices 203 discussed above. Additionally or alternatively, some or all of the sensors may be operably connected to the interactive device instead of being a part of the interactive device 200. For instance, some of the sensors (e.g., temperature sensor, light sensor) may be configured to communicate wirelessly with the interactive device 200. Motion sensors embedded within the interactive device and/or remotely connected to the interactive device may be configured to detect motion of the interactive device itself and/or motion of objects surrounding the interactive device. Some or all of the sensors can be the input devices 203 discussed above. In some embodiments, the user input devices 203 (e.g., microphone) can be used to capture contextual data (e.g., ambient sound).

The interactive device 200 may also include one or more output devices 205 for providing output. Examples of output devices 205 can include a speaker, a display, a printer, a sensation generator for generating a tactile sensation, a smell, and the like.

The processing unit(s) 204 may be capable of executing one or more methods or routines stored in the memory 206. The processing unit 204 can have one or more processors, such as a programmable processor (e.g., a central processing unit (CPU)). For example, the processing unit 204 may include a field programmable gate array (FPGA) and/or one or more ARM processors. The processor(s) may be implemented as appropriate in hardware, computer-executable instructions, firmware or combinations thereof. Computer-executable instruction or firmware implementations of the processor(s) may include computer-executable or machine executable instructions written in any suitable programming language to perform the various functions described.

The memory 206 can include non-transitory computer readable medium for storing logic, code, and/or program instructions executable by the processing unit 204 for performing any suitable embodiment of the methods described herein. The memory 206 can include an operating system 212 and one or more interactive device routines 214. The one or more modules 214, when executed by the processing unit 204, may provide various functionalities associated with the context-based recommendation service as described herein.

For example, the processing unit 204 can be configured to execute instructions causing one or more processors of the processing unit 204 to receive user input and/or contextual data from the input devices 203, sensors 208, and/or communication interface 202. The processing unit 204 can also be configured to execute instructions causing one or more processors of the processing unit 204 to provide some or all of the received data to a remote device (e.g., a service provider computer), receive response data from the remote device, and output some of all of the response data via the output devices 205. The processing unit 204 can also be configured to execute instructions causing one or more processors of the processing unit 204 to process the received data to implement voice recognition, signal processing, context determination, and other techniques discussed herein. The memory 206 can store any data received from the input device 203, sensors 208, and/or communication interface 202, as well as data produced by the processing unit 204.

In some embodiments, the interactive device 200 also communicates via bus 210 with one or more local or remote databases or data stores such as an online data storage system via the bus 210 or the communication interface 202. The bus 210 may comprise a storage area network ("SAN"), a high-speed serial bus, and/or via other suitable communication technology. In some embodiments, such databases or data stores may be integrated as part of the interactive device 200.

Figure 3:
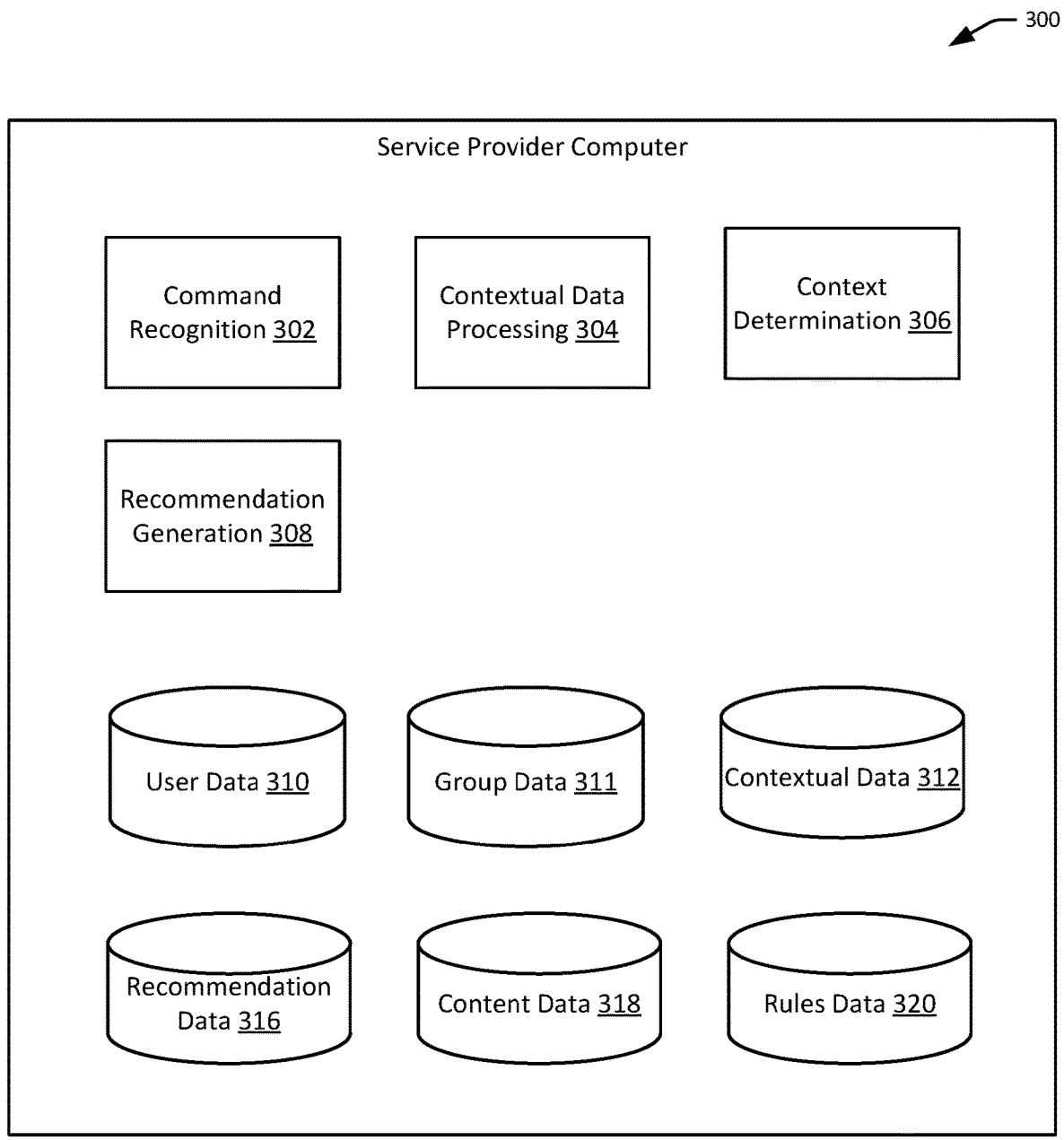
FIG. 3 illustrates components of an example service provider computer configured to provide context-based multi-user recommendations, in accordance with embodiments.

FIG. 3 illustrates components of an example service provider computer 300 configured to provide context-based multi-user recommendations, in accordance with embodiments. In an embodiment, the service provider computer can be configured to obtain contextual data from a device such as discussed in FIGS. 1 and 2, process the contextual data to determine a group context, and generate group recommendations to the device based on the context. As illustrated, the service provider computer 300 can comprise a command recognition module 302, a contextual data processing module 304, a context determination module 306, and a recommendation generation module 308. The service provider computer 300 can further comprise or operatively coupled to a plurality of data stores including a user data store 310, a group data store 311, a contextual data store 312, a recommendation data store 316, a content data store 318, and a rules data store 320. The service provider computer 300 can further comprise a processor (not shown) and a computer-readable medium (not shown) coupled to the processor, the computer-readable medium comprising code, executable by the processor, for implementing the modules and methods described herein.

The command recognition module 302 can be configured to recognize user command. The command recognition module 302 can include a voice recognition module capable of identifying a user's voice from audio data and/or determining a command or request based on the identified voice. The audio data may be stored in user data store 310. For instance, based on a recording of a speech containing "play music," the voice recognition module may be configured to identify a speaker in the audio data as a particular user of a service. Additionally or alternatively, the voice recognition module may be configured to recognize that the phrase "play music" means that the user is requesting music to be streamed. In various embodiments, the voice recognition module may employ any suitable voice or speech recognition techniques such as acoustic modeling, language modeling, and natural language processing methods. In some embodiments, at least some of the functionalities of the voice recognition module may be performed by an interactive device instead. For instance, the interactive device may be configured to identify the speaker whereas the voice recognition module may be configured to determining the meaning of the speech using speech recognition techniques.

Additionally or alternatively, the service provider computer 300 can include a module for recognizing non-audio user commands such as a facial recognition module, a gesture recognition module, and the like. In some embodiments, command recognition module 302 is optional and some or all of the command recognition functionalities may be performed by a device such as an interactive device discussed in FIGS. 1 and 2.

The contextual data processing module 304 can be configured to process contextual data indicative of an environment associated with a request. In particular, the contextual data may be processed to extract certain features indicative of a group setting comprising more than one user. For instance, the audio contextual data may be processed to identify human voices. Image data may be processed to identify human faces. Infrared data may be processed to detect human presence. Location or proximity data may be processed to determine a number and/or distance of nearby user devices. The contextual data and the results of processing the contextual data (e.g., extracted feature descriptor data) may be stored in contextual data store 312. In some embodiments, different types of contextual data or contextual data obtained from different sources can be combined and processed to generate a set of extracted contextual data that represents a more accurate or consistent representation of the environment from which the contextual data is obtained. Any data fusion or sensor fusion techniques may be used including Central Limit Theorem, Kalman filter, Bayesian networks, Dempster-Shafter, and the like.

The context determination module 306 can be configured to determine a context based on the contextual data. In particular, the contextual data, either directly or as processed by the contextual data processing module 304, may be compared with one or more known contextual profiles to determine if the contextual data matches the profile of a group context. A group context is a context where multiple people are present. Examples of a group context include parties, conventions, theatres, amusement parks, restaurants, retail stores, airports, public transits, schools, and the like.

A predetermined contextual profile can comprise a set of profile parameters, each corresponding to a particular feature or aspect extracted from the contextual data. The profile parameter can be associated with a profile parameter value or profile parameter values. For instance, a profile parameter can be loudness or volume of an ambient sound and the parameter value can include a value or a range of values indicating the loudness. In some other embodiments, the profile parameters can include features of non-audio contextual data such as time (e.g., time of day, day of week, day of week, week, month, year, seasonality), location information (e.g., latitude, longitude), movement features (e.g., speed, acceleration), visual features (e.g., brightness), proximity features (e.g., distance to users, objects, or other devices), device information (e.g., device type, device mode, operating system), and the like. Matching contextual data with a contextual profile can include matching features of the contextual data with corresponding profile parameters. Matching extracted features with profile parameters can include matching feature values of the features with the profile parameter values. In some embodiments, if a feature value is equal to the corresponding profile parameter value or falls within the range of the profile parameter value range, then there is a match. In some cases, there is a match between contextual data and a given profile when at least a predetermined number of features from the contextual data match the corresponding profile parameters of the profile.

In some embodiment, a probabilistic approach may be used in matching contextual data and the profile data. A confidence level or weight value indicating confidence of a match may be determined for some or all of the profile parameters or contextual features. An overall confidence level associated with the profile may then be determined based on the parameter- or feature-level confidence levels. A match may be found if the overall profile-level confidence level is above a certain predetermined threshold.

Depending on the types of features included in the contextual data, one or more contextual profiles may be selected and compared with some or all of the features of the contextual data. One or more of the profiles may match the contextual data. In some cases, the profiles are ranked according to their confidence levels indicating likelihood of a match and the top N highest ranking profiles are selected as matching (where N is a positive integer). In some embodiments, when two profiles conflict with each other (e.g., an "airport" profile and "birthday party" profile), one of the conflicting profiles may be removed from consideration based on disambiguation or conflict resolution rules and/or disambiguation factors (e.g., non-audio contextual data, interactive device data, user preferences).

The contextual profile data (including profiles and their associated contexts) and the results of the comparison may be stored in the profile data store (not shown). The contextual profile data may be created by system administrators, users, or generated based on previously processed contextual data. For example, when there is no match for a given set of contextual data, a new profile may be created comprising features extracted from the contextual data. In some cases, new profiles can be created by combining existing profiles.

The recommendation generation module 308 can be configured to generate recommendations based on context(s) determined above by the context determination module 306. Specifically, if a group context is determined, recommendations suitable for group consumption may be generated. For instance, if a party context is determined, party music may be provided. Generating recommendations can include retrieving the recommendations associated with the determined context. The association between contexts and recommendations may be predetermined by system administrators and/or users. The association may also be generated by an automated or semi-automated process based on machine learning algorithms. The data representing associations between contexts and recommendations may be stored in the recommendation data store 316. The content data (e.g., media content such as music or video files with or without associated metadata) from which recommendations are made may be stored in the content data store 318.

In some embodiments, the recommendation generation module 306 can be configured to generate recommendations based on user-level attributes associated with some or all members of the group. Individual users or user accounts may be identified based on the contextual data as processed by the contextual data processing module 304. User attributes associated with the individual users may be retrieved, for example, from the user data store 310. For a given user, user attribute data may include personal information of the user such as age, race, gender, marital status, location, education, nationality, occupation, income, and the like. User attribute data may also include data related to the user's preferences such as a favorite type of media content, a favorite artist, and items in the user's playlists or libraries. In an example, a user may indicate her preference for a particular media content item (e.g., a song, a video) via a user interface such as a web interface or a mobile application provided by the service provider, a voice or gesture interface provided by an interactive device, and the like. User attribute data can also include user behavioral data collected from the user's previous interactions with an interactive device and/or the service provider such as browsing or playback histories, creation, removal and/or editing of playlists and libraries, frequencies and durations of playback of media content, and the like.

In some embodiments, user recommendations can be determined for each user of the group of users based on user attributes associated with each user. One or more group recommendations can be determined based at least in part on the individual user recommendations determined above. For example, a playlist may be generated containing items from at least some of the user recommendations. In an example, the group recommendations include an intersection of two or more of the user recommendations. In another example, the group recommendations include a union of two or more of the user recommendations. In various embodiments, items for the group recommendations may be selected randomly from the user recommendations or according to a predetermined order.

In some embodiments, the recommendation generation module 306 can be configured to generate recommendations based on group-level attributes associated with the group of users as a whole. The group attributes can be determined based at least in part on the group context as determined by the context determination module 306. The group attributes can include demographics such as distribution of age, race, gender, marital status, location, education, nationality, occupation, income, and the like. For instance, a group context of "party on a college campus" may be used to determine group-level attributes such an average age (e.g., 18-22), occupation (e.g., college students), marital status (e.g., single), education, and the like. As another example, features from contextual data (e.g., children's voices in the background) may be used to determine the group attributes (e.g., an average age of the group).

The group attributes can include or be used to determine group preferences. For example, the type of background music in a group context may be used to determine a general preference for the group in the particular context. As another example, a group's demographics (e.g., age, gender, race, etc. for some or all of the group's members) may be used to infer certain preferences based on preference data of other comparable groups with similar demographics. In another example, a group's preference may be determined based on indication of preferences by the group members over a period of time. Such indication of preferences may be correlated with the media content. The group attributes (including preference data) and the association between group attributes and contexts may be stored in the group data store 311.

Group recommendations can be determined based at least in part on the group attributes. For example, group preferences may be used to select the categories, artists, and other aspects of the content to be recommended for the group. In some embodiments, the correspondence between contextual data, contexts, user attributes, and/or group attributes and the corresponding recommendations can be stored (e.g., in the recommendations data store 316) so as to facilitate future generation of the group recommendations.

Rules and configurations governing aspects of the modules discussed above can be stored in the rules data store 320. For instance, rules and configuration data may specify the algorithms and/or techniques used by the various modules. The rules and configuration data may be used by the contextual data processing module 304 to determine the different sets of features to extract for different types of contextual data. The rules and configuration data may also be used by the context determination module 306 to determine whether there is a match between features of contextual data and a contextual profile. The rules and configuration data may also be used by the recommendation generation module 308 to determine attributes used to generate the recommendations, conflict resolution rules with respect to recommendations, minimum and/or maximum number of recommendations to provide, data sources for obtaining recommended content, and the like.

Figure 4:
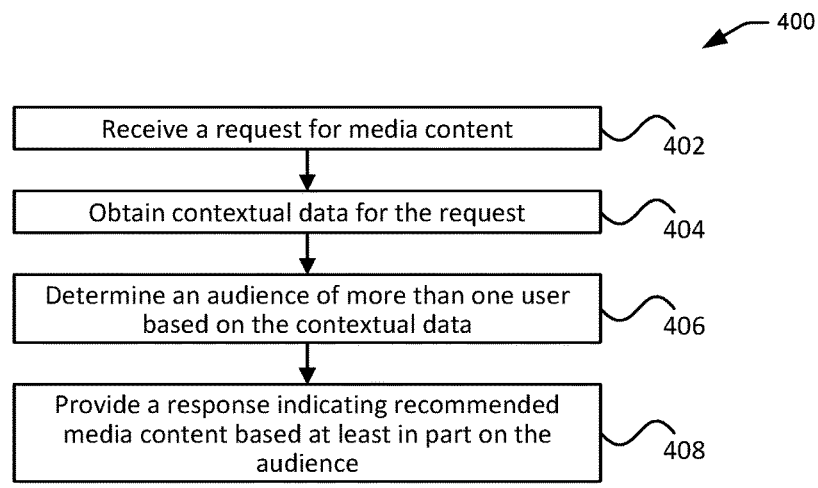
FIG. 4 illustrates an example process for generating multi-user recommendations, in accordance with embodiments.

FIG. 4 illustrates an example process 400 for generating multi-user recommendations, in accordance with embodiments. Aspects of the process 400 may be performed, in accordance with some embodiments, by one or more service provider computers such as discussed in connection with FIGS. 1 and 3, or by an interactive device such as discussed in connection with FIGS. 1 and 2. Some or all aspects of the process 400 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage medium may be non-transitory. The order in which the operations are described is not intended to be construed as a limitation, and any number of the described operations may be combined in any order and/or in parallel to implement the processes.

The process 400 includes receiving 402 a request for media content. The request may be received from an interactive device such as discussed in FIG. 2. The request may be for media content (e.g., music, video) to be streamed to and played-back by the interactive device. The request may be generated in response to a user input such as a voice command (e.g., "play music"), a gesture, or an indication via a keyboard, keypad, mouse, stylus, touchscreen, or other suitable means.

Contextual data for the request can be obtained 404. The contextual data can be obtained based on the request or a separate message. For example, the request may include the contextual data or a reference to the contextual data gathered by the interactive device. Thus, the contextual data can include data indicative of an environment surrounding a user and/or the interactive device. The contextual data may be associated with the user command. For instance, the contextual data can be captured in the same environment in which the command occurs and/or around the same time as when the command occurs. The contextual data can also include non-audio data captured by one or more sensors discussed herein such as location information (e.g., indicating a geographic location of the device making the request), time information (e.g., indicating when the request is made such as time of day, day of week, etc.), movement or motion information (e.g., movement of the device making the request or of an object nearby), visual data (e.g., images of the surrounding environment), proximity or distance to other objects (including users), temperature data, pressure data, chemical data, position information, motion data (e.g., speed, acceleration), and the like. The contextual data may also include information about the device sending the request (e.g., device identifier, device type, device mode, operating system, etc.), user or user account associated with the request, or any other relevant information. Additionally or alternatively, the request may include data that can be used to further determine other contextual data. For instance, the request may include information that can be used to determine a group account associated with the request. Such information may include, for example, a device identifier with which the group account is associated, an identifier of a user or user account that is linked to or otherwise associated with the group account, and the like.

An audience of more than one user can be determined 406 based at least in part on the contextual data. For instance, the presence of more than one distinct person can be determined based on the detection of more than one distinct human voice in ambient sound, the recognition of more than one faces in images, the detection of wireless signals (e.g., Bluetooth signals) from more than one portable devices nearby, data from infrared sensors indicating human presence, and the like. In some embodiments, a context can be determined based on other contextual data such as temperature information, motion information, visual data (e.g., lighting information), and the like. For instance, the rise of a temperature in a room may indicate a gathering of people in the room whereas the fall of the temperature may indicate less people are present in the room. Bright lighting may indicate a group setting wherein dark lighting may indicate less people or a single user setting.

In some embodiments, a group setting may be determined based on characteristics of the interactive device, such as software and/or hardware configurations (e.g., device type, device mode, operating system). For instance, a type of the interactive device (e.g., smart TV) may indicate that the device is meant for communal consumption as opposed to individual consumption (e.g., mobile phone). In some embodiments, a device may be associated with multiple consumption modes. Examples of such a device can include a game console, a smart TV, a media player, and the like. A group mode may indicate that the device (and the output thereof) is meant for group consumption. An individual mode may indicate that the device is meant for individual consumption. Additional modes (e.g., modes associated with groups of different sizes and/or composition) may also be available in some cases. The device may switch between these modes based on predetermined events such as related to time, user input (e.g., via voice command, gesture, remote controller, touchscreen, mouse, keyboard, etc.), and the like.

In some embodiments, the contextual data can be used to identify individual users in the audience. For example, voice recognition techniques and facial recognition techniques may be used to identify users based respectively on audio and visual data. In some other embodiments, a context of a group setting may be determined without identifying individual users. The group context may be determined based on features extracted from the contextual data. For instance, a noisy audio data or an image with multiple human features may indicate a group setting. In some cases, the context may be determined implicitly from time and/or location data (e.g., a Friday evening in a movie theatre).

A response can be provided 408 based at least in part on the audience of more than one user. The response can indicate a list of one or more recommendations, such as media content items (e.g., songs), to be played back, streamed, or otherwise presented by an interactive device. Generating or determining the list of recommendations may include accessing or retrieving existing list of items (e.g., based on an existing playlist), modifying an existing list, or creating a new list. In some embodiments, the recommendations may be generated based at least in part on user-level attributes associated with at least some of the users in the audience that have been identified. Such user attributes may include personal information (e.g., age, gender, race, etc.), user preferences (e.g., favorites), user behavioral data, and the like. Recommendations for each of at least some of such identifiable users may be generated based on the user attributes associated with the respective users. The user-level recommendations may then be used to generate group recommendations.

In some other embodiments, the group recommendations may be generated based at least in part on group-level attributes associated with the audience as a whole. Such group attributes may include group demographics, preferences, and the like. The group attributes may be determined based at least in part on a group context. For instance, a group context of "party on a college campus" can be used to infer certain demographics (e.g., age, education) about a group of people and their preferences. Group recommendations can be determined based at least in part on such group attributes.

In some embodiments, both user-level attributes and group-level attributes may be used to derive group recommendations. For instance, in an embodiment, the user that issues the command on which the request is generated (e.g., "play music") may be identified and user attributes for that user may be obtained. In addition, group-level attributes such as demographics and/or preferences may be determined based on a group context determined from contextual data and/or the contextual data itself. The user-level attributes and the group-level attributes may be combined to determine group-level recommendations. In some cases, user-level attributes are used to generate a first set of recommendations and the group-level attributes are used to generate a second set of recommendations. A third set of recommendations may be generated based at least in part on the first set of recommendations and the second set of recommendations.

In some embodiments, the recommendations discussed above may be stored and associated with specific devices, contextual data or features thereof, group context, user or group attributes, profiles, and the like, so as to facilitate generation of future recommendations.

In some embodiments, the recommendations may be dynamically updated to accommodate changes to the group setting. As such, media content that is streamed or playback by a device may be dynamically updated in response to an update to the group setting surrounding the device. For instance, a change in the composition of the group caused by users leaving or joining the group may be detected (e.g., by a microphone, a camera, a presence sensor, etc.). In some cases, the setting may change from a single-user setting to a multi-user setting or vice versa. As another example, an environmental change may occur such as a change of lighting, sound, theme, activities, and the like. Data related to such change in group composition or the environment may be detected and used to generate new or updated recommendations using techniques described herein. For instance, group recommendations may be updated to take into account the preferences of the new users that have joined the group or to remove or decrease consideration of the preferences of the old users that have left the group. As another example, changes in contextual data (e.g., based on sound, light, etc.) may indicate a new context that corresponds to a different set of recommendations.

In some embodiments, the group recommendations can be generated and/or dynamically adjusted based on feedback of the audience with respect to the media content played. For instance, as the media content is streamed or played back by a device, the audience's feedback indicating preferences of the media content (e.g., voice comments, gestures, facial expressions, input via remote controller, touchscreen, or other input devices) can be captured (e.g., by the device streaming or playing the content). Such feedback data can be used to dynamically adjust subsequent media content to be recommended for the device. For instance, feedback data indicating that most of the audience (e.g., more than a predetermined number or percentage of the audience such as more than 50%, 60%, 70%, or 80% of the audience) likes a particular type of music may be used to increase recommendations of that type of music in the future. Feedback data indicating that most of the audience dislikes a particular type of music may be used to decrease recommendations of that type of music in the future. In some cases, feedback data may be associated with specific account, specific group composition, specific playback device, specific context, and the like.

In some embodiments, device specific information can be used to generate group recommendations. A group setting may be determined based on characteristics of a source device from which the request is sent. Additionally, recommendations may be generated based on characteristics of a target device to which a response or the recommendations are sent. The source device may or may not be the same as the target device. The device characteristics of the target device may include device identifier, device type, device mode, software and/or hardware configurations, user-related data collected by the device (e.g., contextual data, playlists or libraries, user behavioral data, user feedback data), and the like. For instance, if the target streaming or playback device is of a device type that is intended for communal consumption or if the target device is under a group mode, then group recommendations may be generated for the target device.

In some embodiments, identification of the users in a group or a group context can be used to determine a group account representing some or all of the identified users. For instance, if some family members of a particular household are identified, a family account associated with the household may be identified. If users of a circle of friends are identified, a group account associated with the particular circle of friends may be identified. If users of particular organization are identified, a group account associated with the organization may be identified. In other cases, certain group accounts may be associated with certain group contexts instead of or in addition to group members. Thus, the identification of a group context can be used to retrieve the group account associated with the group context. In some embodiments, a group account may be tied to a specific device identifier, device type, device mode, or other device characteristics.

Such device characteristics associated with a device may be included in a request from the device. Based on the device characteristics, a group account may be identified.

Once a group account is identified, data associated with the group account may be used to generate the group recommendations. Such data can include account profile (e.g., location, average age, household income, education, ethnicity, occupation, etc.), account settings (e.g., preferred types of music or artists, playlists, library), account history (e.g., browsing, streaming, or playback history), and the like.

In some embodiments, the context information discussed above can be used to determine whether and/or when to generate and/or provide recommendations at all. In some cases, content may be generated and/or provided with or without explicit user command. For example, media content may be streamed or not streamed depending on the context. In an example, when a temperature of a room (e.g., obtained from a thermostat operably connected to the interactive device) rises above a certain threshold value, a party context may be determined and corresponding party music for the determined context may be streamed automatically to the interactive device without being explicitly requested by the user. In another example, when the temperature of the room falls below a certain threshold value, the streaming of the party music may stop or a different type of music corresponding to a different context corresponding to the cooler temperature may be streamed automatically without being explicitly requested by the user. As another example, wakeup music may start streaming automatically when changes in lighting data (e.g., obtained from a light sensor) indicates morning time.

In some embodiments, the context information discussed above can be used to determine where to provide the recommendations. For instance, when a group context is detected from the contextual data, media content such as music or movies may be streamed to a nearby device that is meant for group consumption (e.g., TV, stereo system) with or without explicitly user command. In some cases, the device used to stream the content may or may not be the same as the device used to receive a user command.

Figure 5:
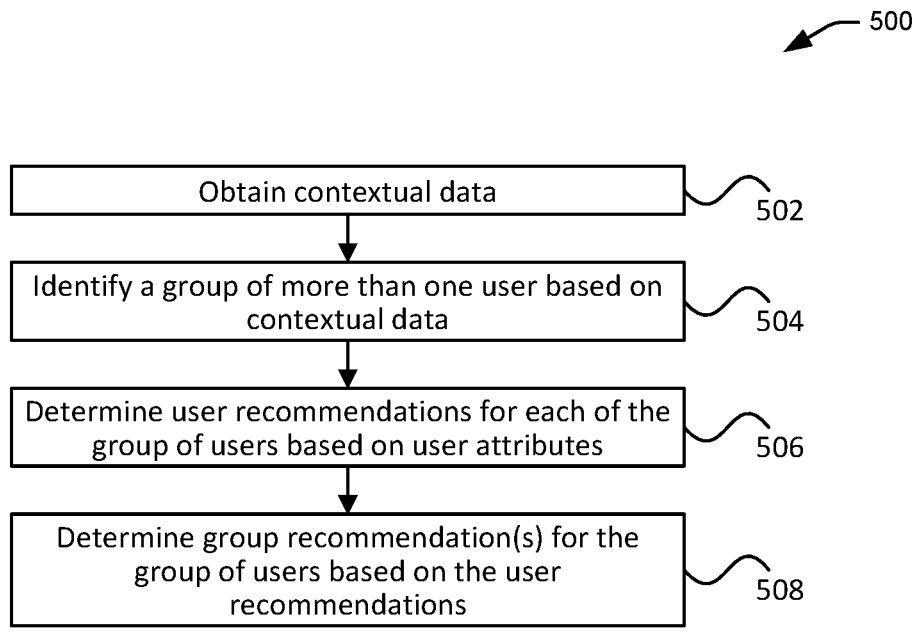
FIG. 5 illustrates an example process for generating multi-user recommendations based on contextual data, in accordance with embodiments.

FIG. 5 illustrates an example process 500 for generating multi-user recommendations based on contextual data, in accordance with embodiments. In particular, the process 500 can be used to generate group recommendations based on user-level attributes. Aspects of the process 500 may be performed, in accordance with some embodiments, by one or more service provider computers such as discussed in connection with FIGS. 1 and 3, or by an interactive device such as discussed in connection with FIGS. 1 and 2.

The process 500 includes obtaining 502 contextual data. The contextual data can be obtained in a similar manner as described in block 404 of the process 400 discussed in FIG. 4.

A group of more than one user can be identified 504 based at least in part on the contextual data. For example, if the contextual data includes sound data, suitable voice recognition techniques may be used to determine the identities of the users associated with distinct voices in sound data. If the contextual data includes image data, suitable facial recognition techniques may be used to determine the identities of the users associated with distinct faces in the image data. As another example, if contextual data includes location information of multiple user devices (e.g., mobile phones, tablets, laptops, desktops) near the interactive device, then users or user accounts associated with such user devices may be identified. In yet another example, one or more users may explicitly indicate their presence using a predetermined input interface such as voice command, gesture, touchscreen, keyboard, keypad, mouse, stylus, and the like. The determination may be based on contextual data for a predetermined period of time. For example, the contextual data may be used to determine whether during predetermined period of time (e.g., 5 minutes, 10 minutes, 30 minutes, etc.), multiple users give commands or otherwise made their presence known (e.g., via voice, gesture, mobile devices, and the like). If so, then a group setting is determined. Otherwise, a non-group setting may be determined. In various embodiments, any combination of the above-described or other suitable techniques can be used to identify users.

In some embodiments, the contextual data can be used to identify a group account. The group account may be identified based on the device used to send the request and/or a user that has been identified based on the contextual data (e.g., via voice recognition, facial recognition, etc.). In some cases, the identifier of the user and/or group account may be provided as part of a request. Individual users or user accounts (e.g., family members) associated with a group account (e.g., a family account) may be retrieved and used to generated recommendations discussed below.

A list of one or more user recommendations can be determined 506 for each user of the group of users based on one or more user attributes associated with each user. Determining the list of recommendations may include accessing or retrieving existing list of items (e.g., based on an existing playlist), modifying an existing list, or creating a new list. In an example, multiple playlists of a given user may be combined, filtered, or otherwise processed to determine the recommended list. In some embodiments, the recommendations may be generated based at least in part on attributes associated with the users. For a given user, user attribute data may include personal information of the user such as age, race, gender, marital status, location, education, nationality, occupation, income, and the like. User attribute data may also include data related to the user's preferences such as a favorite type of media content, a favorite artist, and items in the user's playlists or libraries. In an example, a user may indicate her preference for a particular media content item (e.g., a song, a video) via a user interface such as a web interface or a mobile application provided by the service provider, a voice or gesture interface provided by an interactive device, and the like. User attribute data can also include user behavioral data collected from the user's previous interactions with an interactive device and/or the service provider such as browsing or playback histories, creation, removal and/or editing of playlists and libraries, frequencies and durations of playback of media content, and the like.

The user attributes for a user can be used to generate recommendations for the user. User attributes can indicate user preferences that can be used to determine what to add or not to add to the recommendations. For example, the user's personal information (e.g., age, gender) may be used to infer what the user likely prefers based on data from other users with similar personal attributes. Items from the user's playlists or libraries and/or items associated with the user's favorite artists can be added as recommendations. As another example, user recommendations can include media content that the user has played frequently recently.

In some embodiments, an item may be assigned an item weight value or a similar indicator indicating an importance or relevance of the item with respect to the user's recommendations. A higher weight value may indicate a higher importance or relevance. Items selected based on different user attributes may be assigned different values. For instance, items selected based on the user's playlists may be assigned a higher weight than items selected based on the user's age and gender. Items selected based on the user's recently playback history may be assigned a higher weight than the user's playlists. An item selected based on the user's playback data in the past two days may be assigned a higher weight value than the items selected based on the user's playback data from two weeks ago. And so on. In some embodiments, media items may be ranked according to their weight values and a predetermined number of items from the top may be selected as recommendations.

One or more group recommendations can be determined 508 based at least in part on the individual user recommendations determined above. For example, a playlist may be generated containing items from at least some of the user recommendations. In an example, the group recommendations can include an intersection of two or more of the user recommendations. In another example, the group recommendations can include a union of two or more of the user recommendations. Items for the group recommendations may be selected randomly from the user recommendations or according to a predetermined order. For instance, in an example, user recommendations for a given user are ranked according to the respective weight values and the top N items are selected as group recommendations, where N is a positive integer. As another example, the N items may be selected randomly from some or all of the user recommendations.

In some embodiments, each user may be assigned a user weight value or a similar indicator indicating the relative importance or relevance of the user's preferences in generating the group recommendations. A higher weight value may indicate a higher importance or relevance of the user's preferences in the generation of the group recommendations. The assignment of the user weight values may be determined based at least in part on the perceived role of the user in the group setting. The perceived roles of users may be determined based on contextual data and/or user attributes. For example, the user that issued the command based on which the request was generated (e.g., a voice command to "play music") may be considered to have a more important role than the rest of the group and thus given a higher weight. User attributes such as age, gender, family roles (e.g., parent), job titles or positions, may indicate certain hierarchical relationships among the users with corresponding weight values. For instance, users in more senior roles in a family or workplace may be given higher values than users in more junior roles. In another example, very younger users (e.g., users younger than 5 or any other predetermined age limit) may be given a higher weight so as to filter out certain types of content inappropriate for the young users (e.g., audio or video content with age-inappropriate content). In some embodiments, the weight values among the users of a group may be determined based on their library size, playlist lengths, account history, or other aspects of their respective user data. For instance, a first user with a larger library size or who has been a user for a longer period of time than a second user may have a higher weight value than the second user.

The relative weight values of the users may be used to determine the influence of the users' preferences on the group recommendations. The group recommendations may be generated based more on the preferences of a first user with a higher weight value than on the preferences of a second user with a lower weight value. For example, the group recommendations may include more items selected from a first category of content favored by the first user than from a second category of content favored by the second user. As another example, the group recommendations may include more items selected from the first user's user recommendations than from the second user's user recommendations. In some cases, the user weight values may affect an order in which the recommended content is streamed or played back. For instance, the media items selected based on the first user's preferences may be streamed or played back before the items selected based on the second user's preferences. In some embodiments, the relative user weight values may be used to resolve a conflict between the preferences of two users. For instance, the first user may prefer loud music whereas the second user may prefer quieter music. Because the first user has a higher weight value, the group recommendation may include more loud music and less or no quiet music.

In an alternative embodiment, preferences of the users in a group may not be subject to differential treatment. For instance, in an example, the group recommendations may be selected randomly from the combination of all of the users' recommendations. In another example, an equal number of items may be selected from each user's recommendations to form the group recommendations. In yet another embodiment, a combination of the above-discussed approaches may be used to generate the group recommendations. For instance, preferences of some of the users in the group (e.g., the user that issued the command to play music) may be given a higher priority than the rest of the group, where users may be treated equally (e.g., random selection).

In an alternative embodiment, identification of the users in a group can be used to determine a group account representing the identified users. For instance, if some family members of a particular household are identified, a group account associated with the household may be identified. If users of a circle of friends are identified, a group account associated with the particular circle of friends may be identified. If users of particular organization are identified, a group account associated with the organization may be identified. Once the group account is identified, data associated with the group account may be used to generate the group recommendations. Such data can include account profile (e.g., location, average age, household income, education, ethnicity, occupation, etc.), account settings (e.g., preferred types of music or artists, playlists, library), account history (e.g., browsing, streaming, or playback history), and the like.

Figure 6:
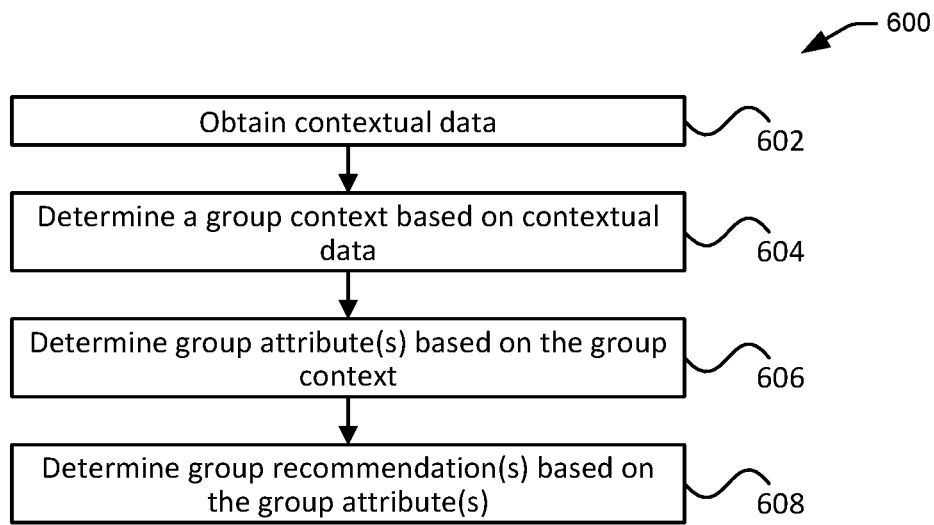
FIG. 6 illustrates another example process for generating multi-user recommendations based on contextual data, in accordance with embodiments.

FIG. 6 illustrates another example process 600 for generating multi-user recommendations based on contextual data, in accordance with embodiments. In particular, the process 600 can be used to generate group recommendations based on group-level attributes. Aspects of the process 600 may be performed, in accordance with some embodiments, by one or more service provider computers such as discussed in connection with FIGS. 1 and 3, or by an interactive device such as discussed in connection with FIGS. 1 and 2. Some or all aspects of the process 600 (or any other processes described herein, The process 600 includes obtaining 602 contextual data. The contextual data can be obtained in a similar manner as described in block 404 of the process 400 discussed in FIG. 4.

A group context can be determined 604 based at least in part on the contextual data. The context may be using techniques described in co-pending U.S. patent application Ser. No. 14/981,273, filed concurrently herewith, entitled "METHODS AND SYSTEMS FOR PROVIDING CONTEXT-BASED RECOMMENDATIONS". In some embodiments, the contextual data can be processed to extract certain features. The extracted features may be compared with predetermined features (or profile parameters) included in one or more existing contextual profiles that indicate a group context to determine whether there is match. If there is a match, the context associated with the matching profile or profiles may be obtained. In various embodiments, the profile-context association may also be defined by a system administrator, a user, or an automated or semi-automated process. A group context includes any context, in which more than one person is present. Examples of group contexts include parties, conventions, theatres, amusement parks, restaurants, retail stores, airports, public transits, schools, and the like. As an example, the sound of loud music and laughter may indicate a party context which is a group context. An image of multipole people can also indicate a group context.

One or more group attributes can be determined 606 based at least in part on the group context and/or the contextual data. The determination may or may not include a rough approximation or estimation that is not necessarily entirely accurate. In some embodiments where a group account has been determined (e.g., based on a user identifier associated with a voice command, device identifier or device type), group attributes associated with the group account may be retrieved. In other cases, group attributes may be estimated based on the context. The group attributes can include demographics such as distribution of age, race, gender, marital status, location, education, nationality, occupation, income, and the like. For instance, a group context of "party on a college campus" may be used to determine group-level attributes such an average age (e.g., 18-22), occupation (e.g., college students), marital status (e.g., single), education, and the like. As another example, features from contextual data (e.g., children's voices in the background) may be used to determine the group attributes (e.g., an average age of the group).

The group attributes can include or be used to determine group preferences. For example, the type of background music in a group context may be used to determine a general preference for the group in the particular context. As another example, a group's demographics (e.g., age, gender, race) may be used to infer certain preferences based on preference data of other comparable groups with similar demographics. In another example, a group's preference may be determined based on indication of preferences by the group members over a period of time. Such indication of preferences may be captured with or without user awareness. In an example, an interactive device may capture audio data such as "I love this," "I can hear that again," "I don't like this," "Skip it," and the like, as the interactive device plays or streams media content. Such audio data may be correlated with the media content being played or streamed to indicate the users' preferences with respect to the media content. Additionally or alternatively, non-audio data can be captured and correlated including visual data (e.g., gestures, facial expressions), indication of preferences via a remote controller, touchscreen, mouse, keyboard, or other suitable input devices. Such indications of preferences can come from multiple users and thus represent group preferences.

Group recommendations can be determined 608 based at least in part on the group attributes. For example, the group recommendations can be generated based at least in part on the group preferences determined above. For instance, group preferences may determine the categories, artists, and other aspects of the content to be recommended for the group. In some embodiments, the group attributes may be assigned weight values or importance indicator that influence the resulting recommendations generated based on the group attributes, similar to the way weight values associated with user attributes can influence the generation of user recommendations based on the user attributes discussed above. In alternative embodiments, the determination of group preferences may be optional and group context may be directly associated with group recommendations.

While FIGS. 5 and 6 discuss methods for generating group recommendations based on user-level attributes and group-level attributes, respectively, in some embodiments, both approaches may be used to derive group recommendations. For instance, in an embodiment, the user that issues the command on which the request is generated (e.g., "play music") may be identified and user attributes for that user may be obtained. In addition, group-level attributes such as demographics and/or preferences may be determined based on a group context determined from contextual data and/or the contextual data itself. The user-level attributes and the group-level attributes may be combined to determine group recommendations. In some cases, user-level attributes are used to generate a first set of recommendations and the group-level attributes are used to generate a second set of recommendations. A third set of recommendations may be generated based at least in part on the first set of recommendations and the second set of recommendations. For instance, the third set of recommendations may include items from the first set or the second set. In another example, the first set of recommendations may be used to select items from the second set of recommendations for the third set of recommendations. In some other embodiments, the user attributes and the group attributes may be combined, and the combined attributes may be used to generate group recommendations. The user attributes and the group attributes may be assigned the same or different weight values or importance for the generation of the group recommendations.

In some embodiments, data mining, statistical analysis, and/or machine learning techniques may be used in any of the steps discussed in FIGS. 4-6. Such techniques can be used to identify correlations or patterns between contextual data and contexts, between contextual data and recommendations, between contexts and recommendations, between attributes (e.g., user attributes or group attributes) and preferences, between attributes and recommendations, between user or group accounts and preferences, between user or group accounts and recommendations, and the like. In some embodiments, such correlations or patterns may be segmented by devices, accounts, geographical regions, or factors. In some embodiments, feedback data such as user feedbacks with respect to the recommended content may be used to train the models used by such techniques so as to improve the results.

Figure 7:
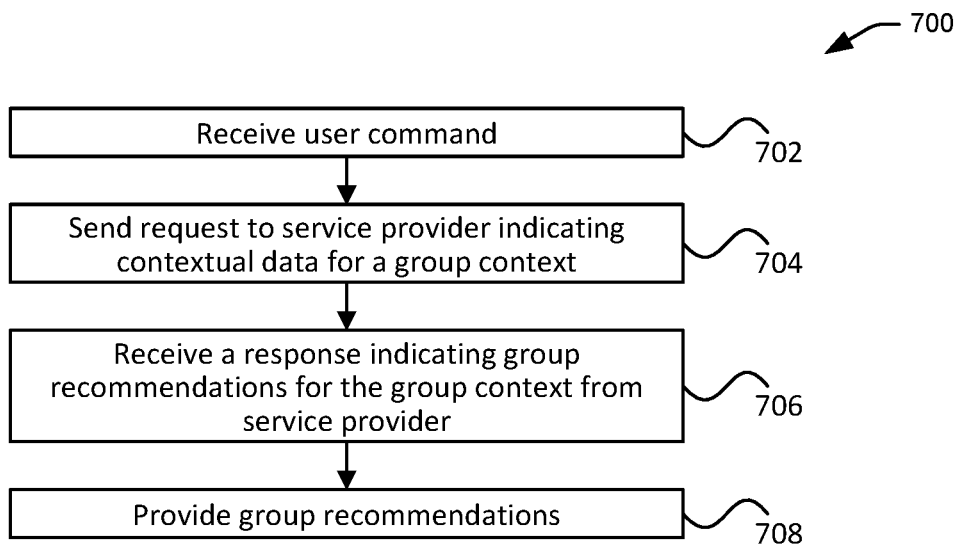
FIG. 7 illustrates an example process for implementing multi-user recommendations, in accordance with embodiments.

FIG. 7 illustrates an example process 700 for implementing multi-user recommendations, in accordance with embodiments. Aspects of the process 700 may be performed, in accordance with some embodiments, by an interactive device such as discussed in connection with FIGS. 1 and 2.

The process 700 includes receiving 702 a user command. The user command may be provided by a user using voice, gesture, touchscreen, or any other suitable methods. An example of a voice command may be "play music," or "tell me what the weather forecast is," or "what is the traffic like from home to work?" In some embodiments, the process 700 may include constant or periodic monitoring of sound in the surrounding environment. Certain predetermined keywords or phrases may trigger "active listening" of voice command. For example, utterance of a nickname for the interactive device may signal that the user is about to issue a voice command and in response, the interactive device may enter into an "active listening" mode for detecting and capturing the user's voice command. Any suitable voice recognition technique may be used to capture the voice command.

Based on the user command, a request to a service provider may be sent 704. The request can indicate the contextual data associated with the request. For instance, the request can include the actual contextual data or reference to the actual contextual data. The request may be generated based on the user command alone, based on contextual data alone (without an explicit user command), or based on a combination of the user command and the contextual data. The service provider may be configured to generate recommendations based on a context of the request. For instance, the service provider may provide multi-user recommendations based on contextual data as described herein. Varying degree of data processing can be performed locally by the interactive device before sending the request. Thus, the request may or may not include the user command itself. For instance, in some embodiments, the speaker of the voice command identified and the meaning of the voice command may be determined using any suitable voice recognition, machine listening, and/or natural language processing techniques. Difference voice commands (e.g., "play music", "play radio", "what is the weather like?" etc.) may lead to requests to different service providers, for different services (e.g., streaming music, streaming radio, getting weather update, etc.), and/or for different user accounts. In such embodiments, the request may not include the actual user input (e.g., voice command) itself. In some other embodiments, only limited data processing (e.g., filtering out background noise of a voice command) is performed on the captured user input. In such embodiments, the request may include the processed user input. In yet some other embodiments, the user input data may not be locally processed at all and provided as is in the request to the service provider.

The request can include the contextual data indicating a group context. Such contextual data may indicate presence of more than one people in the surrounding environment. For instance, microphones attached to or operably connected to the interactive device may capture ambient sound in an environment surrounding the interactive device. The ambient sound may include more than one distinct human voice. Voice recognition techniques may be used to determine the identities of the users associated with distinct voices. Image sensors (e.g., cameras) may capture images of the surrounding environment. Such images can be processed using facial recognition techniques to identify he uses. Proximity sensors (e.g., infrared sensors or lidar sensors) may be used to determine people near the interactive device or people within a predetermined distance from the device. Location sensors (e.g., GPS sensors) may be used to determine people within a certain distance from a given location. Wireless signals (e.g., Bluetooth or Wi-Fi) from portable devices (e.g., mobile phones) near the interactive device may also indicate the presence of a group of people. The contextual data can also include information about the device from which the request is sent and/or to which the response is to be sent such as device identifier, device type, device mode, and other software/hardware characteristics.

The contextual data can be spatially, temporally, or otherwise related to the command. For example, the contextual data can be obtained in the same geographic location as the command and/or around the same time the command was generated. The contextual data can be captured in any suitable manner. For example, different sensors may be activate or inactive at different times and/or in response to different triggering signals or events. As another example, captured contextual data may be filtered, transformed, or otherwise processed before being provided to a service provider. For instance, certain features deemed irrelevant in ambient sound may be filtered out. The size, amount or duration of the contextual data provided to the service provider may be decreased or increased depending on whether information is removed or added to the contextual data.

The request can also include information about the device from which the request is sent such as a device identifier, a user account associated with the device, software and/or hardware configuration of the device, and the like. Information about a user or user account associated with the request may also be send as part of the request such as account identifier, user credentials, and the like.

Subsequently, a response is received 706 from the service provider. The response can indicate group recommendations for the group context. The group recommendations may include a list of media items (e.g., songs, videos) that can be streamed to a target device which may or may not be the same as the requesting device. For example, the response can include information about the group recommendations such as instructions on where and/or how to obtain the recommended content. In this example, additional requests (to the same or different service providers) may be required in order to obtain the data or information to be provided (e.g., played back or streamed) to the user based on the. In another example, the response may include at least some of the recommended content data itself. In this example, no additional requests may be required to provide the recommended content.

In some embodiments, the group recommendations may be provided 708. For instance, where the response is a list of recommended media content from a content streaming service, the content may be streamed via a speaker, a display, a tactile device, or any other suitable output device.

In some embodiments, additional customization may be applied before or when the content is provided to the user. Such customization may be performed by a streaming or playback device. The customization may be based on the current contextual information surrounding the device, or hardware or software configurations of the device (e.g., device type or operating system). For instance, the volume of music being streamed may be set high in a party environment. As another example, the resolution or other aspects of a video may be set according to the screen resolution of a display device.

Figure 8:
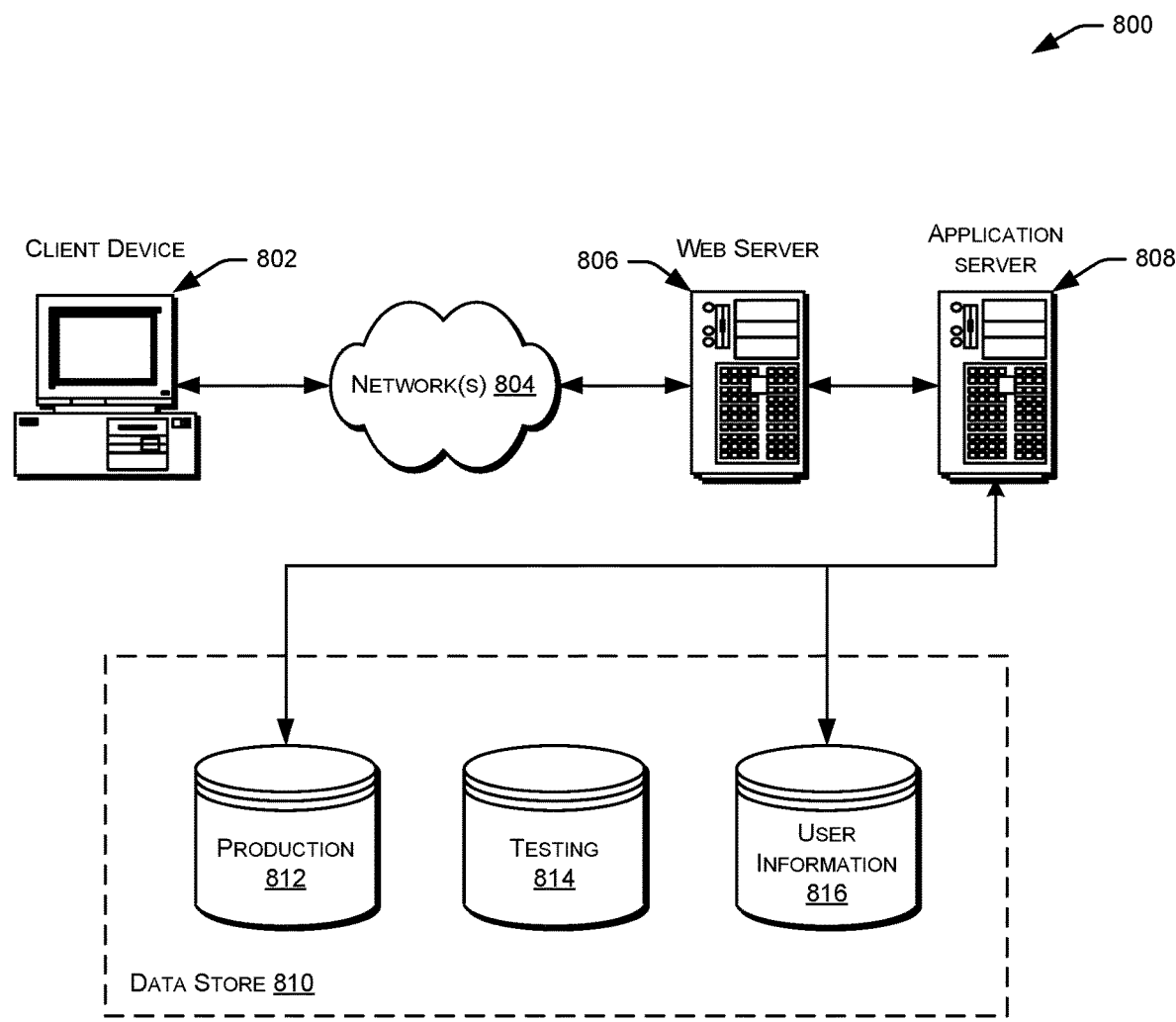
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
  maintaining, with respect to each of a plurality of known group contexts, a contextual profile comprising a set of profile parameters for each known group context and an indication of an activity of a plurality of activities in which one or more users may be engaged;
  receiving, from a voice-activated device, a voice command of a first user requesting media content to be played by the voice-activated device as well as a contextual audio data corresponding to ambient sound within an environment in which the voice-activated device is located, wherein the ambient sound includes user voices as well as other sound data that is independent of media content played by the voice-activated device, and wherein the contextual audio data corresponding to the ambient sound is utilizable to determine a known group context of the plurality of known group contexts;
  identifying, based on a first voice associated with the voice command, the first user;
  determining, based on a second voice associated with the contextual audio data, a presence of a second user different from the first user within a proximity of the voice-activated device;

29 identifying, based on the second voice associated with the contextual audio data, the second user;

determining, based on the first user and the second user, the known group context of the plurality of known group contexts associated with the environment at least in part by comparing an audio feature extracted from the contextual audio data with an audio feature associated with a profile parameter of the known group context, the known group context indicating the activity of the plurality of activities in which multiple people are engaged;

determining a first list of recommended media content for the first user based on a first set of attributes stored in relation to the first user and the known group context, the first list of recommended media content determined based on the activity;

determining a second list of recommended media content for the second user based on a second set of attributes stored in relation to the second user and the known group context, the second list of recommended media content determined based on the activity;

determining a third list of recommended media content based at least in part on the first list and the second list; and providing the third list of recommend media content to the voice-activated device.

2. The computer-implemented method of claim 1, wherein the third list of recommended media content comprises an intersection of the first list and the second list.

3. The computer-implemented method of claim 1, wherein determining the presence of the second user further comprises determining that a mobile device associated with the second user is within a predetermined distance from a predetermined location.

4. A computer-implemented method, comprising:

maintaining, with respect to each of a plurality of known group contexts, a contextual profile comprising profile parameters and an indication of an activity of a plurality of activities associated with a known group context of the plurality of known group contexts;

receiving a request, from a device, for media content to be played by the device;

determining, based on contextual audio data corresponding to ambient sound within an environment in which the device is located, that an audience of the device comprises more than one user, wherein the ambient sound includes user voices as well as other sound data that is independent of media content played by the device, and wherein the contextual audio data corresponding to the ambient sound is utilizable to determine the known group context of the plurality of known group contexts;

identifying, based on a first voice in the contextual audio data, a first set of attributes associated with a first user;

identifying, based on a second voice in the contextual audio data, a second set of attributes associated with a second user;

determining the known group context of the plurality of known group contexts associated with the environment by comparing audio features from the contextual audio data with audio features associated with profile parameters of the known group context, the known group context indicating the activity of the plurality of activities in which the first user and the second user are engaged;

generating a recommended media content based on the first set of attributes, the second set of attributes, and the known group context, the recommended media content being selected based on one or more preferences stored in relation to the activity; and providing the recommended media content to the device.

5. The computer-implemented method of claim 4, wherein the request from the device is generated in response to a voice command.

6. The computer-implemented method of claim 4, wherein determining that the audience of the device comprises more than one user comprises detecting a presence of more than one user near the device.

7. The computer-implemented method of claim 6, wherein detecting the presence of more than one user near the device comprises identifying at least the first voice and the second voice near the device.

8. The computer-implemented method of claim 6, wherein detecting the presence of more than one user near the device comprises determining that more than one mobile devices respectively associated with at least the first user and the second user are located near the device.

9. The computer-implemented method of claim 4, wherein generating the recommended media content comprises:

determining a first list of recommended media content for the first user of the audience based on preferences of the first user;

determining a second list of recommended media content for the second user of the audience based on preferences of the second user; and determining the recommended media content for the device based at least in part on the first list of recommended media content and the second list of recommended media content.

10. The computer-implemented method of claim 4, wherein generating the recommended media content is further based on a type of the device.

11. The computer-implemented method of claim 4, further comprising:

detecting an updated audience for the device, wherein the updated audience includes a different set of users;

generating an updated recommended media content based at least in part on preferences associated with the updated audience; and providing the updated recommended media content to the device.

12. A computer system, comprising:

a memory that stores computer-executable instructions; and a processor configured to access the memory and execute the computer-executable instructions to implement a method comprising:

maintaining, with respect to each of a plurality of known group contexts, a contextual profile comprising a set of profile parameters for each known group context and an indication of an activity of a plurality of activities in which one or more users may be engaged;

receiving a request, from a device, for media content to be played by the device;

determining, based on contextual audio data corresponding to ambient sound within an environment in which the device is located, that an audience of the device comprises more than one user, wherein the ambient sound includes user voices as well as other sound data that is independent of media content played by the device, and wherein the contextual audio data corresponding to the ambient sound is utilizable to determine the known group context of the plurality of known group contexts;

identifying, based on a first voice in the contextual audio data, a first set of attributes associated with a first user;

identifying, based on a second voice in the contextual audio data, a second set of attributes associated with a second user;

determining the known group context of the plurality of known group contexts associated with the environment by comparing audio features from the contextual audio data with audio features associated with profile parameters of the known group context, the known group context indicating the activity of the plurality of activities in which the first user and the second user are engaged;

generating a recommended media content based on the first set of attributes, the second set of attributes, and the known group context, the recommended media content being selected based on preferences stored in relation to the activity; and providing the recommended media content to the device.

13. The computer system of claim 12, wherein the request from the device comprises a voice command.

14. The computer system of claim 12, wherein determining that the audience of the device comprises more than one user comprises determining that the device is under a group mode.

15. The computer system of claim 12, wherein determining the audience of the device comprises:
identifying the first user of the audience; and
determining a group account associated with the first user.

16. The computer system of claim 12, wherein generating the recommended media content comprises:
determining a first list of recommended media content for the first user of the audience based on preferences of the first user;
determining a second list of recommended media content for the second user of the audience based on preferences of the second user; and
determining the recommended media content for the device based at least in part on the first list of recommended media content and the second list of recommended media content.

17. The computer system of claim 16, wherein determining the recommended media content for the device comprises selecting the recommended media content from an intersection of the first list and the second list.

18. The computer system of claim 16, wherein the preferences of the first user and preferences of the second user are determined based at least in part on feedbacks of the first user and the second user with respect to media content played by the device.

19. The computer system of claim 16, wherein generating the recommended media content is further based on demographics associated with the audience.

* * * * *